United States Patent [19]

Badoz et al.

[11] 4,446,215

[45] May 1, 1984

[54] ELECTROCHEMICAL GENERATOR COMPRISING AN AMMONIATE

[75] Inventors: Janine Badoz, Paris; Michelle Bardin, Sucy-en-Brie; Claude Bernard, Saint Vit; Michel Herlem, Versailles; Guy Robert, Morre; André Thiebault, Paris, all of, France

[73] Assignee: Electricite de France (Service National), Paris, France

[21] Appl. No.: 504,485

[22] Filed: Jun. 15, 1983

[30] Foreign Application Priority Data

Jun. 16, 1982 [FR] France .................................. 82 10488
Feb. 22, 1983 [FR] France .................................. 83 02849

[51] Int. Cl.$^3$ ............................................. H01M 6/14
[52] U.S. Cl. .................................... 429/190; 429/191; 429/199; 429/194

[58] Field of Search ................ 429/190, 191, 199–201, 429/194, 196

[56] References Cited

U.S. PATENT DOCUMENTS 4,375,502 11/1983 Gabano .......................... 429/199 X

*Primary Examiner*—Charles F. LeFevour
*Attorney, Agent, or Firm*—Dressler, Goldsmith, Shore, Sutker & Milnamow, Ltd.

[57] ABSTRACT

Electrochemical generators comprising an anode consisting of a highly reducing metal or metallic alloy, such as an alkali metal or alkaline earth metal, a cathode consisting of a reducible material such as CuO, MnO$_2$, AgO, and (SN)$_x$ and a water-free liquid or solid electrolyte consisting of an ammoniate of a salt of a cation of the anode metal or of a more highly reducing metal, the salt being for example a halide or perhalogenate.

22 Claims, 2 Drawing Figures

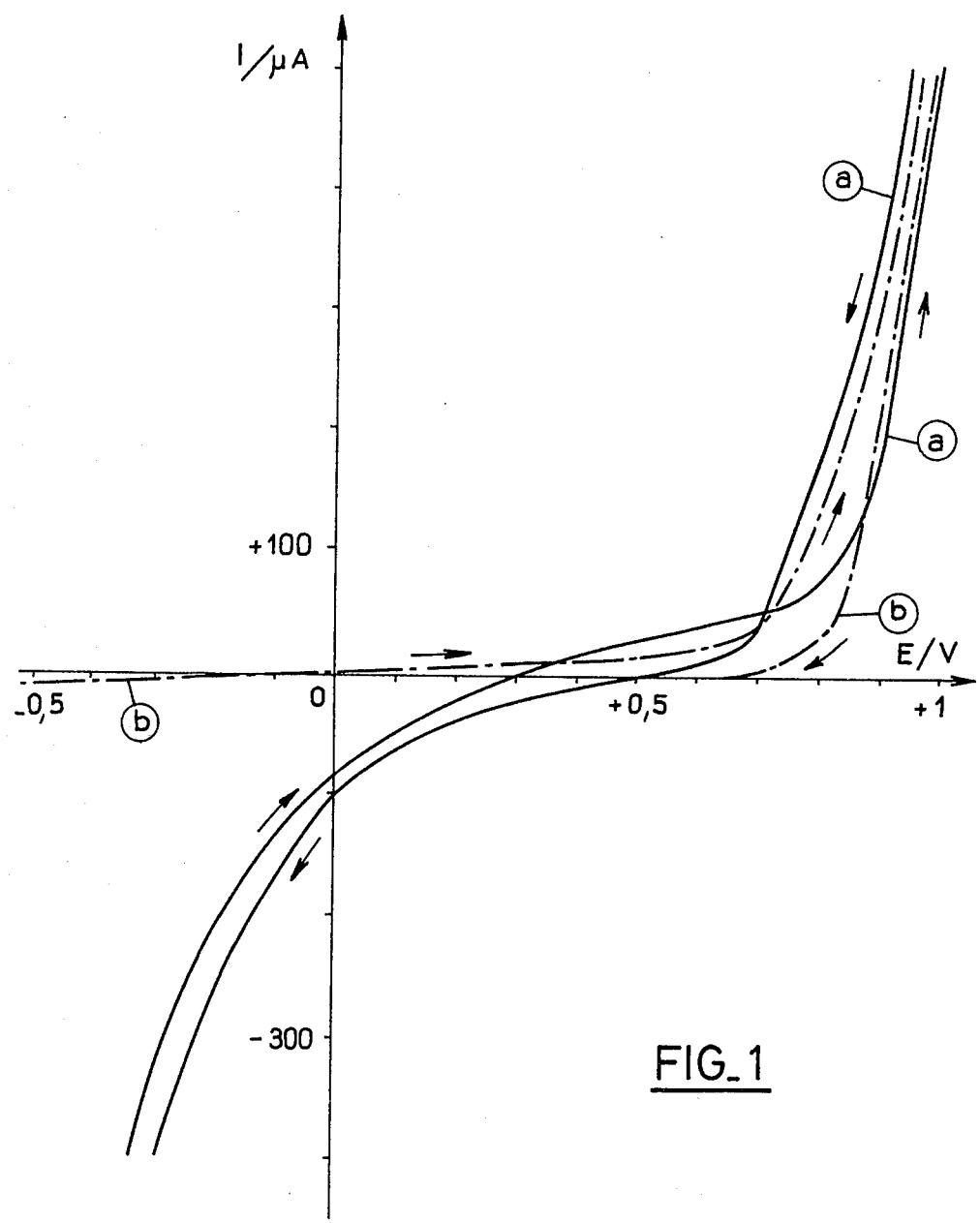
FIG_1

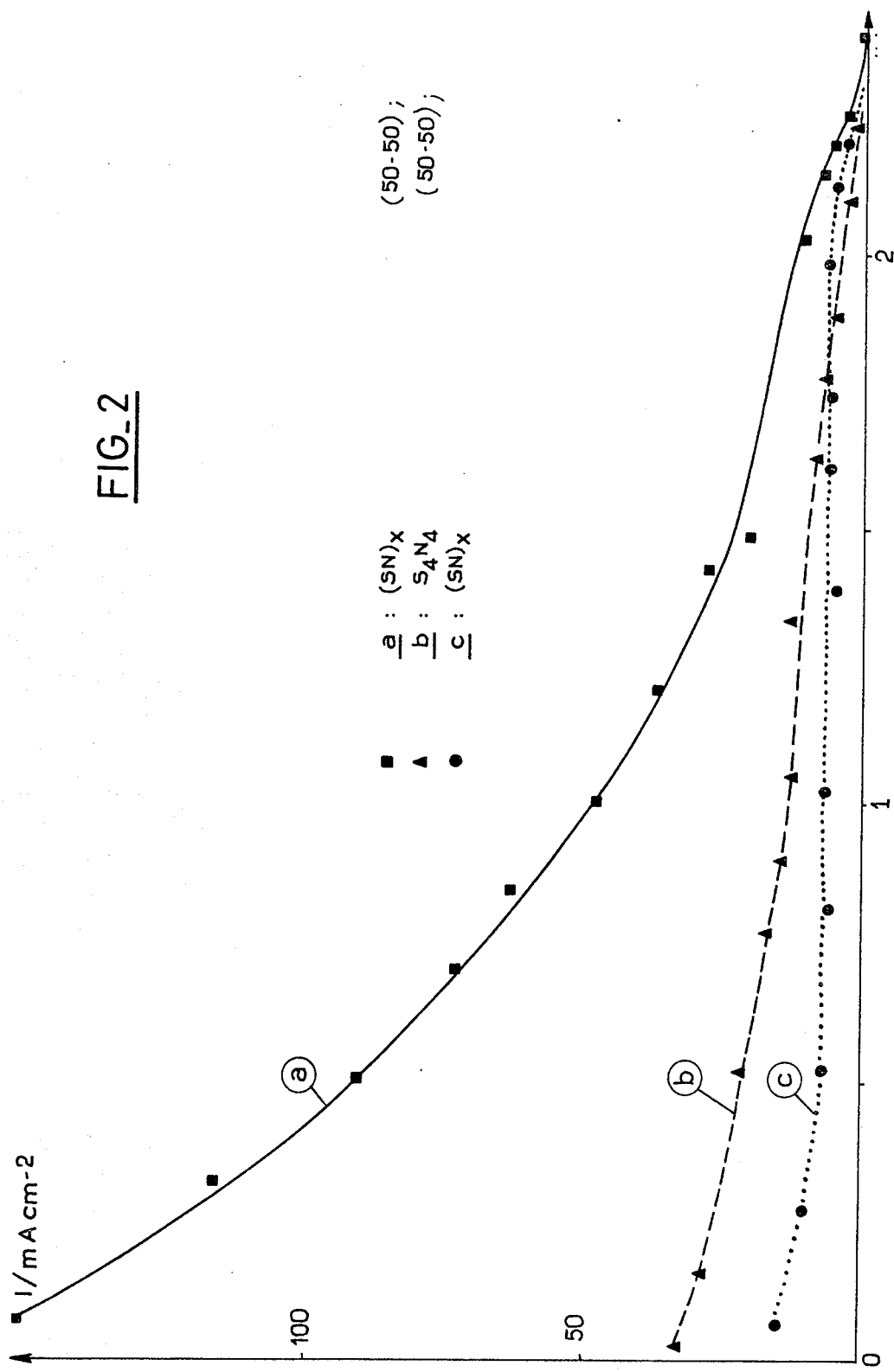

ELECTROCHEMICAL GENERATOR COMPRISING AN AMMONIATE

This invention relates to electrochemical generators of the type comprising an anode consisting of a highly reducing metal or a highly reducing metallic alloy, a cathode consisting of a reducible material, together with a practically water-free liquid or solid electrolyte in which the anode and the cathode are immersed.

There is an increasingly felt need for electrochemical generators capable of functioning at a low temperature ($T \geq -80°$ C.) as well as at ordinary temperature or at elevated temperature ($T \leq 400°$ C.), of giving a high tension and of delivering a high current density. Up till the present the use of nonaqueous solvents does not seem to have emerged into the practical field, especially owing to the low solubility of the electrolytes, which leads to higher resistances. This however is not the case with liquid ammonia which is a solvent capable of dissolving salts up to concentrations of the order of 10 M. Some of these salts lead, with $NH_3$, to the formation of either liquid or solid ammoniates.

A subject of the present invention has been in fact to develop such electrochemical generators of the type defined above, by putting to use electrolytic media consisting of ammoniates.

In accordance with the present invention, this type of electrochemical generator is characterised in that the said electrolyte consists of at least one ammoniate of at least one salt of a cation of the anode metal or of a cation of a metal which is more reducing than the metal taken into consideration at the anode.

According to other features of the invention, the metal or the metals of the metallic alloy of the anode and the metallic cation or cations of the ammoniate or of the ammoniates is, or are, chosen from among the alkali metals, the alkaline-earth metals and aluminium, and the salt or the salts of the ammoniate or ammoniates is, or are, chosen from among the halides, such as the bromides, chlorides and iodides, as well as the perhalogenates, such as the perchlorates, and in general the salts comprising anions which are reducible with difficulty (which are not reduced by the metal or the alloy of metals of the $\ominus$ pole) and which are also oxidisable with difficulty (which are not oxidised by the material or the materials composing the $\oplus$ pole) such as the chloroaluminates and the fluoroborates.

It is possible for example to produce a cell as indicated below:
Na/Li $ClO_4xNH_3$/CuO
Na/Li $ClO_4xNH_3$/$MnO_2$
Na/Li $ClO_4xNH_3$/AgO
Na/Li $ClO_4xNH_3$/$(SN)_x$
Li/Li $ClO_4xNH_3$/$MnO_2$ The employment of such ammoniates as electrolytic media makes it possible to obtain highly conductive media which are liquid or solid and are capable of being practically completely anhydrous. Such electrolytic media have moreover the advantage of having a very wide range of temperatures of existence and of use, ranging from the freezing point of ammonia up to temperatures which may be greater than about 400° C.

As a group the ammoniates possess the fundamental properties of ammonia, but additionally have a certain number of advantages which are particularly critical in the province of their application as electrolytic media. Thus, the decomposition pressure of ammoniates is considerably lower than the vapour pressure of pure ammonia at the same temperature. Moreover, in contrast to ammonia, they do not dissolve the highly reducing metals such as the alkali metals, the alkaline-earth metals and aluminium which are liable to be employed as the anode material. It will be noted for example that lithium is totally insoluble in liquid ammoniate of lithium perchlorate, as is sodium in liquid ammoniate of lithium perchlorate.

In accordance with the present invention, the ammoniates are employed in a practically anhydrous state. In fact, the presence of water in a large quantity in the ammoniates, for example greater than about 5% by weight, would lead to two types of major disadvantages. First of all a self-blocking of the cell would occur through consumption of the anode produced, for example, on a basis of sodium or of lithium, following its being attacked by the water. The formation of an inhibiting layer of hydroxide of the anode metal would also be observed. Therefore, in practice electrolytes composed of practically water-free ammoniates will be called for. The presence of a few percent of water can nevertheless be tolerated.

The ammoniates being combinations of one or several salts and of molecules of ammonia, their preparation in the anhydrous state can of course be carried out by starting from anhydrous salts and from anhydrous ammonia. If obtaining anhydrous ammonia, or ammonia containing only very small amounts of water, presents no problem in practice, this is not also the case for salts which are necessary for the formation of ammoniates. In fact, these salts are very often hygroscopic ($LiClO_4$, NaI, and the like) and are therefore obtained with relatively large quantities of water of several percent by weight. The dehydration of the salts can be carried out by physical means such as a high vacuum and/or a temperature higher than the ambient temperature, but these techniques are generally long and never end finally in a perfectly anhydrous salt.

An aim of the present invention is also to obtain an ammoniate in a practically anhydrous state, with a view to its employment as an electrolyte in an electrochemical generator of the abovementioned type. According to this additional feature, the ammoniate is prepared by a reaction of the salt X of a cation of a metal M″ which is at least as reducing as the metal or the metals M′ of the anode, in liquid ammonia in the presence of an amide of an alkali metal $MNH_2$.

According to another additional feature of the present invention, the said amide of an alkali metal $MNH_2$ is prepared in situ in the liquid ammonia serving for the formation of the ammoniate, by a reaction of the said ammonia on an alkali metal M in the presence of a catalyst.

It will finally be noted that the metals do not react, or practically do not react, that is react infinitely slowly, with the molecules of ammonia. Such a reaction would in fact require the presence of catalysts to lead to the corresponding amide.

Other features and specific advantages of the present invention will become apparent from the reading of the detailed description given below, especially with reference to various examples of specific ammoniates and of electrochemical generators employing them as electrolytic media, as well as to the attached drawings in which:

FIG. 1 shows:

curve a: a volt-ampere record traced at an electrode of $(SN)_x$ immersed in the ammoniate of sodium iodide; scanning speed: 0.05 Vs$^{-1}$; reference: Ag↓/Ag$^+$ (|Ag$^+$|=5 10$^{-3}$M); material surface area: 4 mm$^2$.

curve b: a volt-ampere record traced at an electrode of polished platinum immersed in NaI 3.3NH$_3$; scanning speed: 0.05 Vs$^{-1}$; reference: Ag↓/Ag$^+$; Pt electrode surface area: 0.8 mm$^2$.

FIG. 2 shows current-voltage characteristic curves of a battery the ⊖ pole of which consists of sodium and the ⊕ pole of which consists of various materials.

It must first of all be emphasised that the present invention makes it possible to avoid the disadvantage resulting from the property of ammonia of dissolving reducing metals such as alkali metals and alkaline-earth metals. This property of ammonia, which prohibits the implementation of electrochemical generators without separate compartments, is set aside when ammonia is in the presence of a large quantity of a salt whose cation is the same as that of the reducing metal or is the cation of a metal which is more reducing than the metal or the metals employed at the anode, any dissolution of which, or any other parasitic oxidation-reduction reaction of which, it is desired in fact to avoid.

The ammoniates employed in the scope of the present invention are liquid or solid addition compounds associating one or more molecules of a salt or of several salts to one or more molecules of ammonia. They are therefore in a way analogous compounds to hydrates in which molecules of water have been replaced by molecules of ammonia.

Ammonia bears much resemblance to water in all the properties which place this liquid in its remarkable position among all the solvents. Although ammonia dissolves salts less well, in general, than water, it is superior to all the other solvents.

The properties of water and of ammonia are summarised in Table I below.

TABLE I

| Physical constants of ammonia and of water | | |
|---|---|---|
| | Ammonia | Water |
| boiling point | −33.35 | 100 |
| melting point | −77.7 | 0 |
| density | 0.61 at +20° C. | |
| | 0.65 at −10° C. | 1 at +4° C. |
| | 0.69 at −40° C. | |
| critical temperature | 132° C. | 374° C. |
| specific heat in cal/g | 1.10 at 0° C. | 1.00 at 20° C. |
| heat of vapourisation | 327 at −33° C. | 541 at 100° C. |
| heat of fusion | 83.9 at −77° C. | 79.7 at 0° C. |
| dielectric constant | 22 at −33° C. | 81.7 at +18° C. |
| | 17 at +20° C. | |
| molecular weight | 17 | 18 |
| viscosity in centipoise | 0.2543 at −33.5° C. | 1.0050 at +20° C. |
| | 0.1411 at +20° C. | |
| dipole moment | 1.49 × 10$^{-18}$ esu | 1.85 × 10$^{-18}$ esu |

The abnormally elevated boiling point of ammonia indicates, as for water, that ammonia can form hydrogen bonds. Substances which are capable of forming hydrogen bonds with ammonia are therefore highly soluble. The basic nature of ammonia is equally responsible for the solubility of certain compounds. Often it is difficult to distinguish the effects due to the basicity of ammonia from the effect due to the tendency to form hydrogen bonds; for example, for the solubility of phenols. A phenomenon related to the basicity of ammonia is its tendency to coordinate the ions of transition metals such as $Ni^{2+}$, $Cu^{2+}$, $Zn^{2+}$ and $Ag^+$. In general, salts of such metals are highly soluble in liquid ammonia.

To illustrate the remarkable solvent property of ammonia, cited below are, as a simple indication, some values expressed in grams of salt dissolved per 100 g of liquid ammonia at 25° C.

TABLE II

| NaF | NaCl | NaBr | NaI |
|---|---|---|---|
| 0.35 | 3.02 | 137.95 | 161.90 |
| KF | KCl | KBr | KI |
| 0 | 0.04 | 13.50 | 182 |
| | NH$_4$Cl | NH$_4$Br | NH$_4$I |
| | 102.5 | 237.9 | 368.5 |
| | AgCl | AgBr | AgI |
| | 0.83 | 5.92 | 206.84 |

The dielectric constant of ammonia, which equals 22 at its boiling point (−33° C.), is considerably lower than that of water, 80 at 20° C., but higher than that of acetic acid for example, 6.6. As may be expected, the solubilities of ionic salts in ammonia are intermediate between those in water and those in acetic acid, except for the salts whose anions are very polarisable because of London forces. Some solubilities which are fairly representative of each of these solvents are collected in Table III below.

TABLE III

Solubilities of some ionic salts in water, ammonia, acetic acid and hydrazine (in g per 100 g of solvent at 25° C.)

| | solvent | | | |
|---|---|---|---|---|
| salt | Water | Ammonia | Acetic Acid | Hydrazine |
| LiNO$_3$ | 52.2 | 243.7 | 10.3 | |
| NaNO$_3$ | 91.8 | 97.6 | 0.17 | 100 |
| KNO$_3$ | 37.8 | 10.4 | 0.18 | 14 |
| NaCl | 37 | 3.02 | 0.07 | 8 |
| NaI | 190 | 162 | | 64 |
| KBr | 70 | 13.5 | | 60 |
| KI | 147 | 182 | | 175 |

In this Table III hydrazine also appears which is a solvent as basic as ammonia, but with a much higher dielectric constant (52 at 20° C.).

A liquid ammoniate can be considered as a very concentrated solution of an inorganic salt in liquid ammonia. The ratio of the number of molecules of salt to the number of molecules of ammonia depends on the temperature and on the pressure. For a saturated solution, at a given temperature, the dissociation pressure makes it possible to ascertain the bond between the ammonia and the compound which is associated with it. The heat of formation can also be taken into consideration.

Consequently, the inorganic salts which are very soluble in liquid ammonia will give liquid ammoniates if the solution, saturated or not, is in equilibrium with gaseous ammonia under a pressure which is much lower than the saturating vapour pressure of this gas at the same temperature.

The liquid ammoniates which can be considered as the most advantageous in the scope of the present invention are those for which the pressure of ammonia is lower than or equal to one atmosphere at the ordinary temperature. As an example, some examples of salts illustrating the stability of liquid ammoniates are cited in Table IV below.

TABLE IV

| Salt | NH$_4$Br | NH$_4$I | NaI | KI |
|---|---|---|---|---|
| temperature at | 4° C. | 25° C. | 42° C. | −15° |

TABLE IV-continued

| Salt | NH₄Br | NH₄I | NaI | KI |
| --- | --- | --- | --- | --- |
| which pNH₃ = 1 atm. | | | | |

It is reported that other liquid ammoniates also exist in the region of the ordinary temperature of at higher temperatures. Thus, lithium perchlorate forms a liquid ammoniate at ordinary temperature. The aluminium halides which absorb ammonia with a great evolution of heat, also lead to liquid ammoniates at temperatures above 100° C.

Just as in the case of hydrates, there exist ammoniates which are in a solid state and all the salts which form liquid ammoniates can form solid addition compounds with molecules of ammonia.

The solid ammoniates conduct current and therefore serve as solid electrolytes in the scope of the present invention. They can in particular be employed in a sintered state.

As examples of solid ammoniates usable as an electrolyte material can be mentioned lithium halides of the formula:

$$Li_x \cdot zNH_3$$

where
X=Cl, Br, and
$1 \leq z \leq 4$.

Table V below shows the temperatures of dissociation of ammoniates of lithium bromide and of lithium chloride under atmospheric pressure $[p(NH_3) \leq 1 \text{ atm.}]$

TABLE V

Temperature of dissociation of $Li_x \cdot zNH_3$ ammoniates
$[p(NH_3) \leq 1 \text{ atmosphere}]$

| ammoniates | $\theta$ = temperature of dissociation in °C. | |
| --- | --- | --- |
| LiCl.NH₃ | $\theta > 85$ | melts when |
| LiBr.NH₃ | $\theta > 95$ | $\theta > 97$ |
| LiCl.2NH₃ | $85 > \theta > 60$ | |
| LiBr.2NH₃ | $95 > \theta > 87$ | |
| LiCl.3NH₃ | $60 > \theta > 15$ | |
| LiBr.3NH₃ | $87 > \theta > 71.5$ | |
| LiCl.4NH₃ | $\theta < 15$ | |
| LiBr.4NH₃ | $\theta < 71.5$ | |

Other solid ammoniates, such as the ammoniates of aluminium halides for example of AlI₃ and AlCl₃, can also be mentioned. It will be noted in particular that aluminium chloride makes it possible to obtain a very stable ammoniate of the formula AlCl₃.6NH₃. The latter, however, loses a molecule of ammonia at about 180° C. to form AlCl₃.5NH₃ which melts at about 380° C. and boils at about 450° C.

Other examples of ammoniates will appear from the reading of some specific examples of generators which are mentioned below.

With the exception of potassium amide KNH₂, other amides of alkali metals are poorly soluble. In the particular case where the amides are prepared directly in situ in anhydrous ammonia, or in ammonia containing only very small quantities of water, they are obtained in the form of very fine particles not coated by the corresponding hydroxide MOH and are therefore very reactive towards any compound donating protons, such as water. On account of this high reactivity, the amides of alkali metals react quantitatively with water contained in the salts of metallic cations M″X when they are added to ammonia:

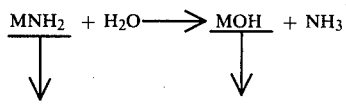

All of the water contained in the salt of a metallic cation M″X is therefore converted into a hydroxide MOH, which is poorly soluble and which does not react with the metal M′ or the metals M′ constituting the anode of the electrochemical generator.

So as to be certain of eliminating the total quantity of water contained in the salt of a metallic cation M″X, the alkali metal amide MNH₂ will be present in a slight stoichiometric excess relative to this quantity of water contained in the salt of the metallic cation M″X.

In the particular case corresponding to the most advantageous embodiment of the present invention where the amide is formed in situ, the salt of the metallic cation M″X will be added to the liquid ammonia only after final completion of the reaction of formation of this amide.

In practice, perfectly satisfactory results are obtained when the metal M of the amide is chosen to be at least as reducing as the metal M′ of the anode or as the metal M″ of the ammoniate. This particular choice makes it in fact possible to avoid, during the addition of the salt M″X to the ammonia, the presence of an exchange between the metals M and M″, which would lead to an ammoniate of the salt MX which could be reduced by the metal M′ of the anode of the electrochemical generator.

In practice it has also been found that excellent results were being obtained when the chosen metal M of the amide was identical to the metal M″ of the ammoniate.

In the particular case where an anhydrous ammoniate is prepared in the liquid form, the latter can be recovered very easily after decantation and separation of the excess amide MNH₂ and of the hydroxide MOH derived from the quantitative reaction of the amide MNH₂ with the water contained in the salt M″X. Once the anhydrous ammoniate has been prepared in this way, it is infinitely easier to remove the molecules of NH₃ from it than to eliminate the molecules of water contained in the initial salt. It is thus possible to obtain salts which are rigorously anhydrous.

According to a variation of the embodiment of the process of the present invention, it is also possible to introduce into ammonia a commercial amide which will however already have undergone a partial hydrolysis due to the atmospheric humidity. Such a commercial amide is then in the form of grains coated with a fine film of hydroxide MOH which is relatively poorly soluble and which consequently inhibits the reactivity of the amide relative to compounds donating protons, such as water. In such a case, it is then advisable to grind this reagent more finely, protected from all traces of moisture, in order to increase its reactivity which makes it possible to ensure total subsequent dehydration of the ammoniates.

A particular example of a preparation of a liquid and anhydrous ammoniate, namely the ammoniate of lithium perchlorate, will be given below by way of illustration.

The chosen composition of the ammoniate of lithium perchlorate corresponds approximately to the formula LiClO$_4$.4NH$_3$. The quantity prepared was 800 g, corresponding to 500 g of LiClO$_4$ and 300 g of NH$_3$.

The lithium perchlorate employed contained about 3% by weight of water, that is 15 g in total in this case. It is therefore advisable to provide for the use of 7 g of lithium.

To a mass of 300 g of NH$_3$, corresponding to a volume of 430 ml at a reaction temperature of about −40° C., are added 7 g of lithium in the presence of a catalyst consisting, for example, of a metallic wire coated with platinum black or of a rusted iron wire. Lithium then reacts with ammonia according to the reaction equation:

It is only when all of the lithium has reacted with the ammonia that LiClO$_4$ is added to the solvent while allowing the temperature to increase up to about 20° C. After decantation, the liquid ammoniate of lithium perchlorate is obtained in a rigorously anhydrous state and free from LiNH$_2$ and from LiOH.

Some particular examples of generators according to the invention are cited below:

EXAMPLE I

CELL: Na/AMMONIATE OF SODIUM IODIDE/(SN)$_x$

Ammoniates of sodium iodide of formula NaI.xNH$_3$ have proved particularly advantageous as an electrolyte, in particular because they are very good conductors. The vapour pressure of ammonia in these compounds is considerably lower than the saturating vapour pressure of ammonia at the same temperature. Ammoniates of sodium iodide can exist either in a liquid form or in the form of a gel. Thus at an ordinary temperature, the ammoniate of sodium iodide is liquid between the two boundary compositions NaI, 3NH$_3$ and NaI.3.5NH$_3$. Below and above these two boundary compositions, it is a highly conductive gel, in the same way as the liquid ammoniate. From the Table VI below, it follows that the ammoniate NaI.3.3NH$_3$ is particularly advantageous. It can moreover be employed in a range of temperatures from −80° C. to +80° C.

TABLE VI

| Characteristics of the ammoniate NaI.xNH$_3$ | | | |
|---|---|---|---|
| NaI.xNH$_3$ | | | |
| x | 3 | 3.3 | 3.55 |
| specific gravity at 20° C. | 1.63 | 1.58 | 1.54 |
| p(NH$_3$) at 20° C. | 37.5 | 43 | 55 |
| at 80° C. in cm Hg | 100 | | |
| concentration of NaI in M.1$^{-1}$ at 20° C. | 6 M | 5.75M | 5 M |

In such an electrolytic medium, which is rich in Na$^+$ ions, sodium is not soluble and does not react with ammonia. This metal can therefore constitute the anode, for example, of a cell without a compartment. As cathode material, use has been made, for example, of sulphur polynitride (SN)$_x$, equally insoluble. Sulphur, which is soluble but which reacts with NH$_3$, has not been retained in practice. Sulphur polynitride, which may be employed pure or in a mixture with graphite, is a synthetic inorganic polymer which has a conductivity of metallic type at ambient temperature, of the order of 10$^3$Ω$^{-1}$cm$^{-1}$. It can give insertion compounds with bromine (which are reversible), with iodine bromide (IBr) and with alkali metals (partially reversible).

The use of sulphur polynitride as cathode material and of sodium as anode material leads to excellent practical results, and makes it possible in particular to obtain energisable cells employing the ammoniate of sodium iodide. In fact, ammonia being a liquid under pressure, as soon as the temperature exceeds −33° C., its injection, at a time when it is desired to dispose with complete certainty of the energy of a generator, is easy in a cell containing the electrodes and the salt (or the mixture of salts) which will combine with the molecules of NH$_3$. It is possible to provide for the injection of the ammoniate (or of the mixture of ammoniates) into the cell containing the electrodes.

In the ammoniate of sodium iodide which is oxydised starting from +0.6 V[3I$^-$−2e$^-$→I$_3^-$] and which is reduced starting from −2.1 V [Na$^+$+e$^-$→Na ↓ ], relative to the reference Ag/Ag$^+$ (5.10$^{-3}$M), over a polished platinum electrode, a sulphur polynitride electrode has a rest potential of +0.3 V (relative to Ag/Ag$^+$).

Starting from this potential, the growth of a reduction barrier and of an oxidation barrier is observed (see FIG. 1).

An electrode of (SN)$_x$ and a sodium electrode immersed in NaI.3.3NH$_3$ which are not connected to each other do not react with the solvent. The potential difference (which is equal to the e.m.f. of the cell in open circuit) is 2.4 V.

This difference of potential is moreover the same as the + pole constituted by an electrode comprised of (SN)$_x$ dispersed in graphite, by S$_4$N$_4$ dispersed in graphite, or even by graphite alone. On the other hand, the characteristic curves, voltage current, have a shape which is essentially different (see FIG. 2). Thus, the power available at each voltage is by far the highest when the cathode consists of (SN)$_x$ dispersed in graphite. In the case of pure (SN)$_x$, it seems that a saturation phenomenon comes into play. With pure (SN)$_x$ or (SN)$_x$ dispersed in graphite at the ⊕ pole, it seems that it is possible to have a real specific capacity greater than 40 Ah/Kg, that is a specific energy greater than 80 Wh kg$^{-1}$. In fact, if, as is very probable, insertion compounds of sodium are formed with sulphur polynitride, it is possible, by increasing the surface/mass ratio, to exceed greatly the capture of 0.1 atom of sodium per SN unit [a number measured at the present time for a cubic crystal of (SN)$_x$ with a side of a few mm] and thus to increase the specific energy in the same proportions.

The discharge curves through a resistance of 1000 ohms of cells composed of pure (SN)$_x$, or of (SN)$_x$ dispersed in sintered graphite, at the ⊕ pole, and of sodium at the ⊖ pole show that the lifetimes per unit of mass and for an identical surface area are of the same order of magnitude for pure (SN)$_x$ as for (SN)$_x$ dispersed in graphite. For S$_4$N$_4$ dispersed in graphite the lifetime is much shorter; in addition with this cathodic material the current and the voltage are not stable (see Table 7).

TABLE VII

Current and voltage of discharges of various cells, all employing sodium at the ⊖ pole

| cathodic material at the ⊕ pole | mass of material in g | surface area in cm$^2$ | potential difference in V | intensity in mA | amount of electricity/ mass of cathodic material |
|---|---|---|---|---|---|
| pure (SN)$_x$ | 0.037 | 0.33 | >2.1 | >2 | 167.5 |
| (SN)$_x$/graphite 50—50 | 0.812 | 0.8 | >1.9 then ≃1 | >2 then ≃1 | 149 |
| S$_4$N$_4$/graphite 50—50 | 0.605 | 0.8 | decreases continually from: 2.2 to 1 | decreases continually from: 2.3 to 1 | 28.3 |
| pure graphite | 495 | 0.8 | rapid drop from: 2.4 to 1 | rapid drop from: 2.2 to 1.3 | 7.2 |

In anhydrous ammoniate of sodium iodide, the behaviours of sulphur polynitride (SN)$_x$ (pure or dispersed in graphite) and of sodium, for which no passivation effect has been observed, have thus made it possible to construct an energisable cell of a voltage of 2.4 V which is clearly superior to the theoretical voltage of the sodium-sulphur cell which is only 1.85 V. The possibility of being able to employ this cell in a vast temperature domain from −80° C. to +80° C., with high current densities, without risk of explosion, makes it specially attractive.

EXAMPLE 2
CELL: Na/AMMONIATE OF SODIUM IODIDE/MnO$_2$

Compared to the cell of example 1, this cell, employing manganese dioxide as the cathodic material, has made it possible to obtain an electromotive force of 2.8 V, that is 400 mv higher relative to that of example 1.

EXAMPLE 3
CELL: Li/AMMONIATE OF LITHIUM PERCHLORATE/(SN)$_x$

The absorption of ammonia by one molecule of anhydrous lithium perchlorate at 20° C. can proceed up to 4.6 molecules of NH$_3$. From 3.5 molecules of NH$_3$ onwards a liquid is obtained. Beyond 4.3 molecules of NH$_3$ the ammoniate becomes solid again. It is the liquid of the composition LiClO$_4$.4NH$_3$ which has been employed in this study (density about 1.2). Just like the ammoniate NaI.3.3 NH$_3$, it is a highly conductive liquid.

In this ammoniate of formula LiClO$_4$.4NH$_3$, lithium is not soluble and does not react with NH$_3$.

The electromotive force in an open circuit is 2.8 V. As in the case of the cell Na/NaI.3,3NH$_3$/(SN)$_x$, it is possible to attain fairly high current densities when (SN)$_x$ is well dispersed in graphite.

EXAMPLE 4
CELL: Li/AMMONIATE OF LITHIUM PERCHLORATE/MnO$_2$

As in the case of example 3, the electrolyte medium employed was LiClO$_4$.4NH$_3$. The electromotive force in an open circuit is 3.2 V.

EXAMPLE 5
CELL: Li/AMMONIATE OF LITHIUM PERCHLORATE/CuO

The electrolyte medium employed is still LiClO$_4$.4NH$_3$. The electromotive force is 2.64 V in an open circuit.

EXAMPLE 6
CELL: Al/AMMONIATE OF LITHIUM PERCHLORATE/MnO$_2$

The electrolyte medium employed is LiClO$_4$.4NH$_3$. The electromotive force is 1.8 V in an open circuit.

EXAMPLE 7
CELL: Al/AMMONIATE OF LITHIUM PERCHLORATE/CuO

The electrolyte medium employed is still LiClO$_4$.4NH$_3$. The electromotive force is 1.3 V in an open circuit.

The present invention is, of course, not limited to the embodiments already described, but it is perfectly possible, for all that without departing from the scope of the present invention, to devise a certain number of variations of its embodiment. Thus, for example, the cathodic material may consist of intercalation products. Moreover, one may vary the composition of the ammoniate to modify its state (liquid or non-liquid).

We claim:

1. An electrochemical generator of the type comprising an anode consisting of a highly reducing metal or a highly reducing metallic alloy, a cathode consisting of a reducible material, together with a practically water-free liquid or solid electrolyte, in which the anode and the cathode are immersed, characterised in that the said electrolyte consists of at least one ammoniate of at least one salt of a cation of the anode metal or of a salt of a cation of a more highly reducing metal than the anode metal or metals.

2. An electrochemical generator according to claim 1, characterised in that the anode metal or metals and the ammoniate or ammoniates is, or are, chosen from the group consisting of the alkali metals, the alkaline-earth metals and aluminium.

3. A generator according to claim 1, characterised in that the salt of the ammoniate is chosen from the group consisting of the halides and the perhalogenates.

4. A generator according to claim 1, characterised in that the ammoniate is in a liquid form.

5. A generator according to claim 1, characterised in that the ammoniate is in the form of a gel.

6. A generator according to claim 1, characterised in that the ammoniate is in a solid form, and in particular in the sintered state.

7. A generator according to claim 4, characterised in that the ammoniate corresponds to the formula:

$$NaI.xNH_3$$

where more particularly $3 \leq x \leq 3.5$.

8. A generator according to claim 4, characterised in that the ammoniate corresponds to the formula:

$$LiClO_4.yNH_3$$

where more particularly $3.5 \leq y \leq 4.3$.

9. A generator according to claim 6, characterised in that the ammoniate corresponds to the formula:

$$Li_x.zNH_3$$

where X=Cl, Br, and more particularly $$1 \leq z \leq 4.$$

10. A generator according to claim 6, characterised in that the ammoniate corresponds to the formula:

$$AlCl_3.nNH_3$$

where n=5 or 6.

11. A generator according to claim 1, characterised in that the cathodic material is chosen from the group consisting of CuO, $MnO_2$, AgO, $(SN)_x$ and intercalation products.

12. A generator according to claim 11, characterised in that the cathodic material consists of sulphur polynitride dispersed in graphite, and in particular of the mixture $(SN)_x$-graphite [50-50].

13. An electrochemical generator of the type comprising an anode consisting of a highly reducing metal M' or an alloy of highly reducing metals M', a cathode consisting of a reducible material, and a liquid or solid and substantially anhydrous electrolyte, the said electrolyte consisting of at least one ammoniate of at least one salt X of a cation of a metal M" which is at least as reducing as the metal or metals M' of the anode, according to claim 1, characterised in that the said ammoniate is prepared in an anhydrous state by the reaction of the said salt of a metallic cation M"X in liquid ammonia in the presence of an amide of an alkali metal $MNH_2$.

14. An electrochemical generator according to claim 13, characterised in that the said amide of an alkali metal $MNH_2$ is prepared in situ in liquid ammonia serving for the preparation of the ammoniate, by reaction of the said ammonia with an alkali metal M in the presence of a catalyst.

15. A generator according to claim 14, characterised in that the temperature of reaction of in situ formation of the amide $MNH_2$ is about $-40°$ C.

16. A generator according to claim 14, characterised in that the said catalyst consists of a metallic wire coated with platinum black.

17. A generator according to claim 14, characterised in that the salt of a metallic cation M"X is added to liquid ammonia only after final completion of the reaction of in situ formation of the amide $MNH_2$.

18. A generator according to claim 13, characterised in that the amide of an alkali metal $MNH_2$ is present in a slight stoichiometric excess relative to the quantity of water contained in the salt of a metallic cation M"X.

19. A generator according to claim 13, characterised in that the chosen metal M of the amide is at least as reducing as the metal M' of the anode or as the metal M" of the ammoniate.

20. A generator according to claim 13, characterised in that the chosen metal M of the amide is identical to the metal M" of the ammoniate.

21. A generator according to claim 13, characterised in that the anhydrous ammoniate is recovered in the liquid state after decantation and separation of the excess amide $MNH_2$ and of the hydroxide MOH derived from the quantitative reaction of the amide $MNH_2$ with the water contained in the salt M"X.

22. A generator according to claim 13, characterised in that the said amide of an alkali metal is lithium amide.

* * * * *